L. H. THOMAS.
Sieve.

No. 221,478.   Patented Nov. 11, 1879.

Attest:
F. H. Schott,
D. P. Cowl

Inventor:
Levi H. Thomas
Jr. J. C. Tasker & C. attys

UNITED STATES PATENT OFFICE.

LEVI H. THOMAS, OF READING, MICHIGAN.

IMPROVEMENT IN SIEVES.

Specification forming part of Letters Patent No. 221,478, dated November 11, 1879; application filed April 4, 1879.

*To all whom it may concern:*

Be it known that I, LEVI H. THOMAS, of Reading, in the county of Hillsdale and State of Michigan, have invented certain new and useful Improvements in Sieves; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention relates to an improvement in that class of household implements called "flour-sifters," which are used not only as a sifter, but also for conveying the sifted flour, sugar, or other material from the bag or barrel to the pan or tray in which it is to be mixed; and the invention consists in the manner of constructing and attaching the handle; also, in providing the latter with a series of graduated marks, by which the quantity of flour in the implement may be readily determined by an inspection of the marks upon the lower part of the handle, as will be hereinafter fully described.

Figure 1:
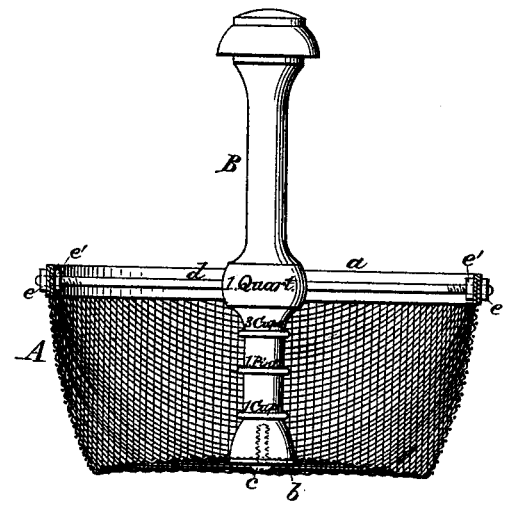
Figure 2:
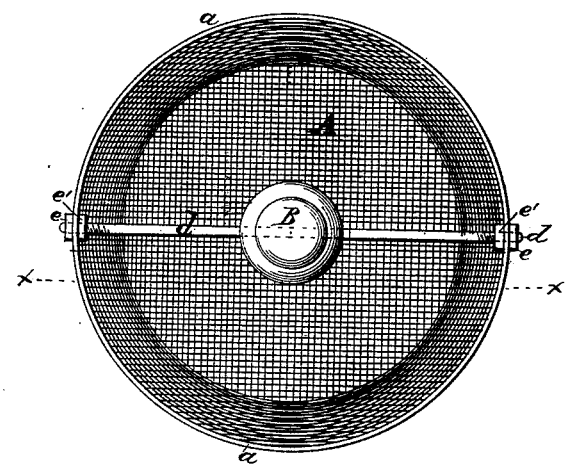

In the drawings, Figure 1 is a vertical section of the device upon the line *x x* of Fig. 2. Fig. 2 is a top or plan view, showing the relative arrangement of the several parts of the implement to each other.

The body of the implement is composed of wire-cloth of suitable texture, a sheet of which of the proper size is struck up between dies to form the cup-shaped sieve A, the bottom being made slightly concave, as shown in Fig. 1 of the drawings, to give it greater strength in resisting a downward thrust, to which it is exposed when in use. The upper edge of this sieve, after trimming to a level, is inclosed between the two parts of the rim *a*, which is formed with a U-shaped section or gutter, into which the edge of the sieve enters, and which is then closed down upon it by passing the rim between rollers, or by any other suitable means, by which process the wires of the sieve are partly embedded in the rim, so as to form a strong and perfect union, which may be somewhat strengthened, if desired, and the implement protected from rust, by immersing the whole in a bath of melted tin, which leaves a coating of that metal upon the surface and solders the edge of the sieve and rim together.

The handle B is preferably of wood, the lower end being secured to the bottom of the sieve by means of a washer, *b*, placed upon the outside, through which passes the screw *c* into the end of the handle, thus securing the parts firmly together.

An additional security, as well as a means of adjusting the handle centrally with relation to the rim *a*, is given by the rod *d*, which passes diametrically through both handle and rim, and is provided with screw-nuts *e* and *e'* at its ends, by means of which it is secured and adjusted to the rim. This rod *d* also prevents the handle from turning without carrying the sieve with it, as it would be liable to do if the fastening at the bottom of the handle were alone depended on for conveying motion from the handle to the sieve in operating the implement.

A series of annular projections are formed upon the lower part of the handle within the sieve, and marked with the weight or quantity which it would contain when filled to that point, as one cup, two cups, and so on, or one pint, one quart, and their fractional parts. If desired, these marks may be adjusted to indicate pounds and fractions thereof, instead of measures of capacity.

The method of operating the implement is to seize it by the handle, insert it into the flour, sugar, or other material to be used, giving it at the same time a slightly rotary motion, when the material to be sifted will pass inward through the meshes of the sieve, filling it to the point desired, when it may be lifted by the handle and its contents deposited in the mixing-pan or other receptacle.

Having thus described my invention, I claim as new, and desire to secure by Letters Patent, the following:

1. The household implement hereinbefore described, consisting, essentially, of the cup-shaped sieve provided with the metallic rim, the graduated handle, and stay-rod, arranged and operating as specified.

2. The graduated handle B, in combination with the cup-shaped sieve A and rod *d*, provided with the adjusting screw-nuts *e* and *e'*, substantially as and for the purpose set forth.

In testimony that I claim the foregoing as my own I hereunto affix my signature in presence of two witnesses.

LEVI H. THOMAS.

Witnesses:
PORTER W. THOMAS,
SAMUEL WHALEY.